United States Patent
McAlister et al.

(10) Patent No.: US 8,343,025 B2
(45) Date of Patent: Jan. 1, 2013

(54) CENTRIFUGAL CONCENTRATOR WITH SUSPENDED ROTOR BOWL

(75) Inventors: Steven A. McAlister, Abbotsford (CA); Mark Henry Vinchoff, Burnaby (CA)

(73) Assignee: Steven A. McAlister, Abbotsford (CA)

( * ) Notice: Subject to any disclaimer, the term of this patent is extended or adjusted under 35 U.S.C. 154(b) by 607 days.

(21) Appl. No.: 12/446,812

(22) PCT Filed: Oct. 23, 2007

(86) PCT No.: PCT/CA2007/001885
§ 371 (c)(1),
(2), (4) Date: May 8, 2009

(87) PCT Pub. No.: WO2008/049212
PCT Pub. Date: May 2, 2008

(65) Prior Publication Data
US 2010/0240513 A1    Sep. 23, 2010

Related U.S. Application Data

(60) Provisional application No. 60/862,498, filed on Oct. 23, 2006.

(51) Int. Cl.
*B04B 9/12* (2006.01)
*B04B 11/04* (2006.01)

(52) U.S. Cl. ............... 494/29; 494/37; 494/60; 494/62; 494/80; 494/84

(58) Field of Classification Search ............ 494/23–30, 494/37, 43, 46, 60, 62, 80, 84; 210/360.1, 210/380.1
See application file for complete search history.

(56) References Cited

U.S. PATENT DOCUMENTS

| | | | | |
|---|---|---|---|---|
| 2,140,388 | A | * 12/1938 | Lucas | 494/80 |
| 4,286,748 | A | * 9/1981 | Bailey | 494/29 |
| 4,824,431 | A | 4/1989 | McAlister | |
| 4,891,041 | A | * 1/1990 | Hohmann et al. | 494/62 |
| 5,462,513 | A | * 10/1995 | McAlister | 494/56 |
| 5,728,039 | A | * 3/1998 | Knelson | 494/29 |
| 6,796,934 | B1 | * 9/2004 | McAlister et al. | 494/56 |
| 7,585,269 | B2 | * 9/2009 | McAlister | 494/26 |
| 2008/0280746 | A1 | * 11/2008 | McAlister | 494/8 |
| 2010/0240513 | A1 | * 9/2010 | McAlister et al. | 494/37 |

FOREIGN PATENT DOCUMENTS

| | | |
|---|---|---|
| CA | 2149978 A1 | 11/1996 |
| DE | 3425706 A1 | 1/1986 |
| EP | 0281321 A2 | 9/1988 |
| JP | 2001065647 A2 | 3/2001 |
| WO | WO 9637307 A1 * | 11/1996 |
| WO | WO 2008049212 A1 * | 5/2008 |

OTHER PUBLICATIONS

International Search Report dated Dec. 20, 2007 relating to Patent Cooperation Treaty Application No. PCT/CA2007/001885.

* cited by examiner

*Primary Examiner* — Charles E Cooley
(74) *Attorney, Agent, or Firm* — Bruce M. Green; Oyen Wiggs Green & Mutala LLP (57) ABSTRACT

A centrifugal concentrator in which there is a common shaft for the drive motor and concentrator bowl. The cost of bearing assemblies is thereby minimized. The bowl is driven and suspended from above to keep the motor out of the slurry area and maximize the simplicity of the design. A fluidizing fluid is delivered through the common shaft.

13 Claims, 9 Drawing Sheets

CENTRIFUGAL CONCENTRATOR WITH SUSPENDED ROTOR BOWL

REFERENCE TO RELATED APPLICATION

This application claims priority from U.S. provisional patent application Ser. No. 60/862,498 filed Oct. 23, 2006, which is pending.

TECHNICAL FIELD

The present invention relates to centrifugal concentrators of the rotating bowl type for the separation of solids of higher density such as gold, iron or tin from a slurry containing solids of a lower density and liquid and more particularly to such centrifugal concentrators of the batch type.

BACKGROUND

Various machines have been developed to separate particles of high density such as gold, iron or tin from tailings and other slurry streams using centrifugal concentration, using the centrifugal force created in a rotating bowl to separate the high density particles from the lower density slurry. The present applicant for example has invented batch centrifugal concentrators which are the subject of U.S. Pat. No. 4,824,431 and Canadian Patent no. 2149978, which are incorporated herein by reference. Such machines are designed to maximize the throughput of slurry, and are designed to withstand the heavy duty and wear arising from a relatively long-term operation at a mine. The rotating bowl is typically mounted on a shaft supported on large bearings, and is rotated by a motor beneath the machine which drives a drive belt connected to a sheave on the rotor shaft.

Artisanal or small-scale mining is a mining activity which involves people working with simple tools and equipment, outside the legal and regulatory framework. Currently, it is estimated that there are many millions of people involved in artisanal mining around the world and that number is growing with the elevated price of gold. It takes place in the remote parts of the world's poorest countries. It usually involves the activities of single individuals or a small group of individuals who are impoverished and exploiting marginal deposits in harsh conditions. One common form of artisanal mining is placer gold mining or panning for gold. In order to separate the retrieved gold from the ore, the artisanal miner will often crush the ore and use mercury which combines with the gold to form an amalgam, and which can be separated from the other material as "cake". The miners then heat the cake to burn off the mercury, leaving a residue of gold as well as causing health and environmental problems. There is therefore a need for a simple and inexpensive but environmentally safe method for artisanal miners to separate gold from particulate material.

SUMMARY OF INVENTION

In order to provide a simple, inexpensive centrifugal concentrator for use in artisanal mining or other applications, the invention provides a centrifugal concentrator in which there is a common shaft for the drive motor and concentrator bowl. The cost of bearing assemblies is thereby minimized. The bowl is preferably driven and suspended from above to keep the motor out of the slurry area and maximize the simplicity of the design. A fluidizing fluid is preferably delivered through the common shaft.

According to one aspect of the invention, the rotor housing may be a 45 gallon drum partially filled with concrete for stability. The wear protection at the upper interior surface of the drum can be an automobile tire, whereby the artisans can provide part of the structure of the machine locally.

BRIEF DESCRIPTION OF DRAWINGS

In drawings which illustrate a preferred embodiment of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
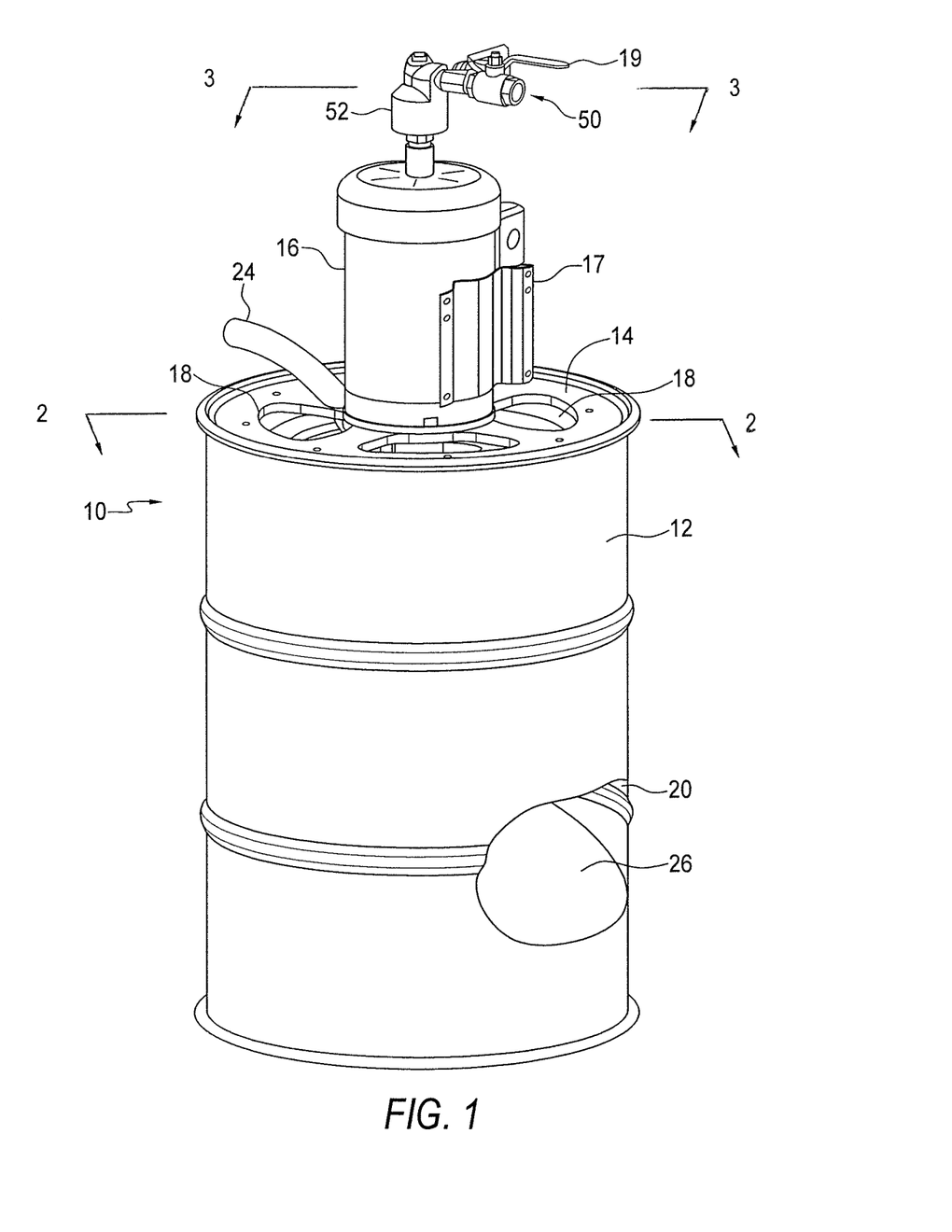
FIG. 1 is a perspective view of the centrifuge of the invention with water and power supplies and connections removed for ease of illustration.
Figure 2:
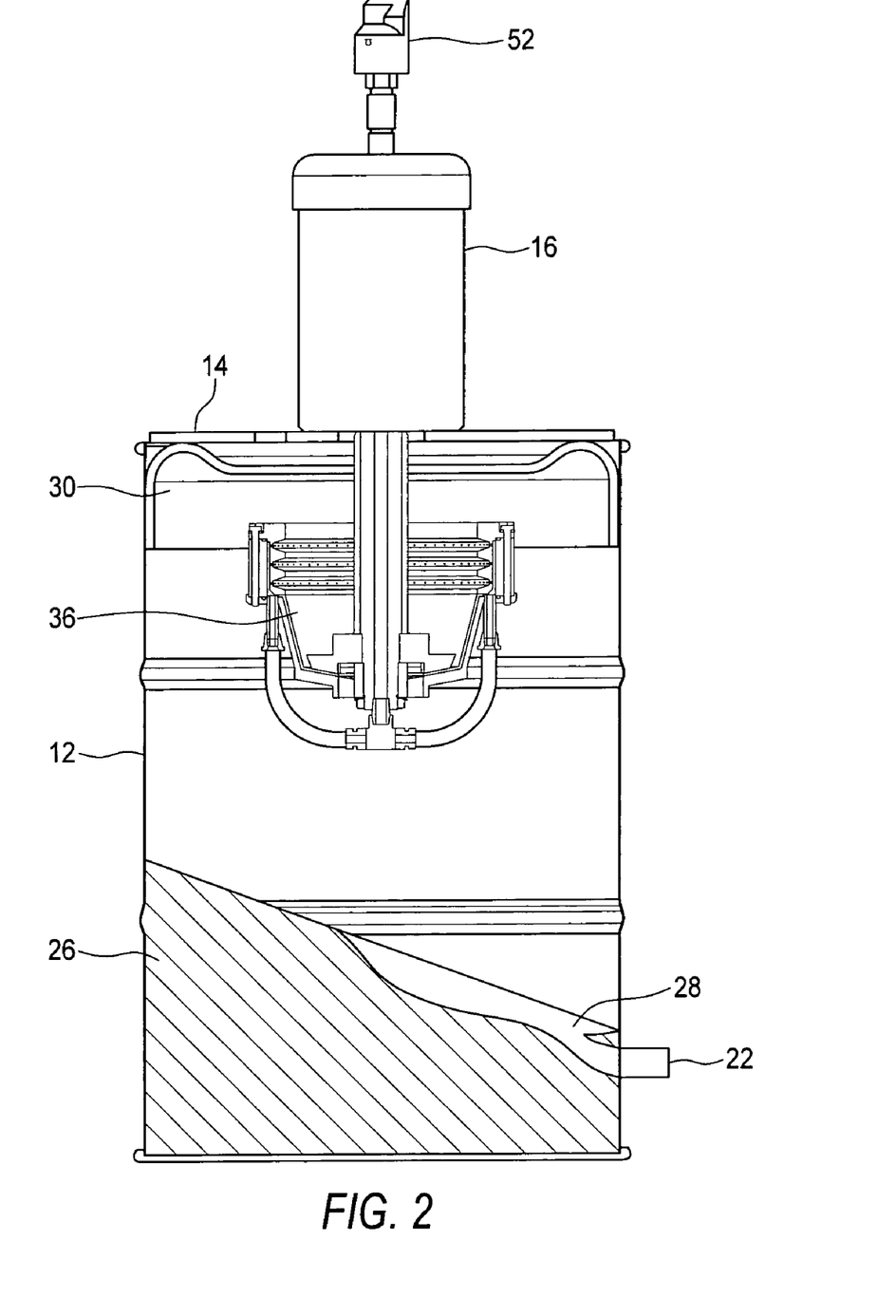
FIG. 2 is a partial vertical cross-section of the invention taken along lines 2-2 in FIG. 1.
Figure 3:
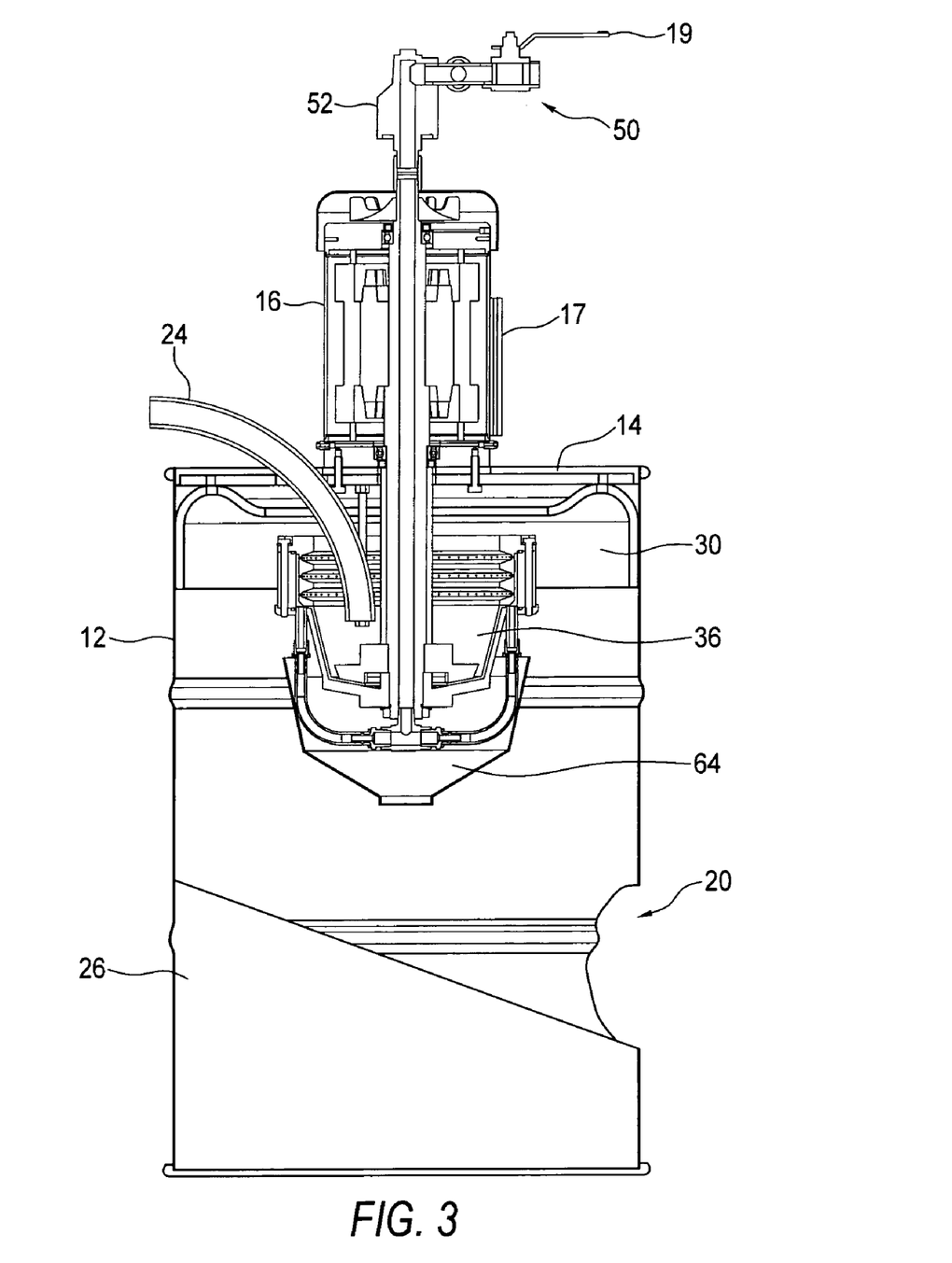
FIG. 3 is a vertical cross-section of the invention taken along lines 3-3 in FIG. 1.
Figure 4:
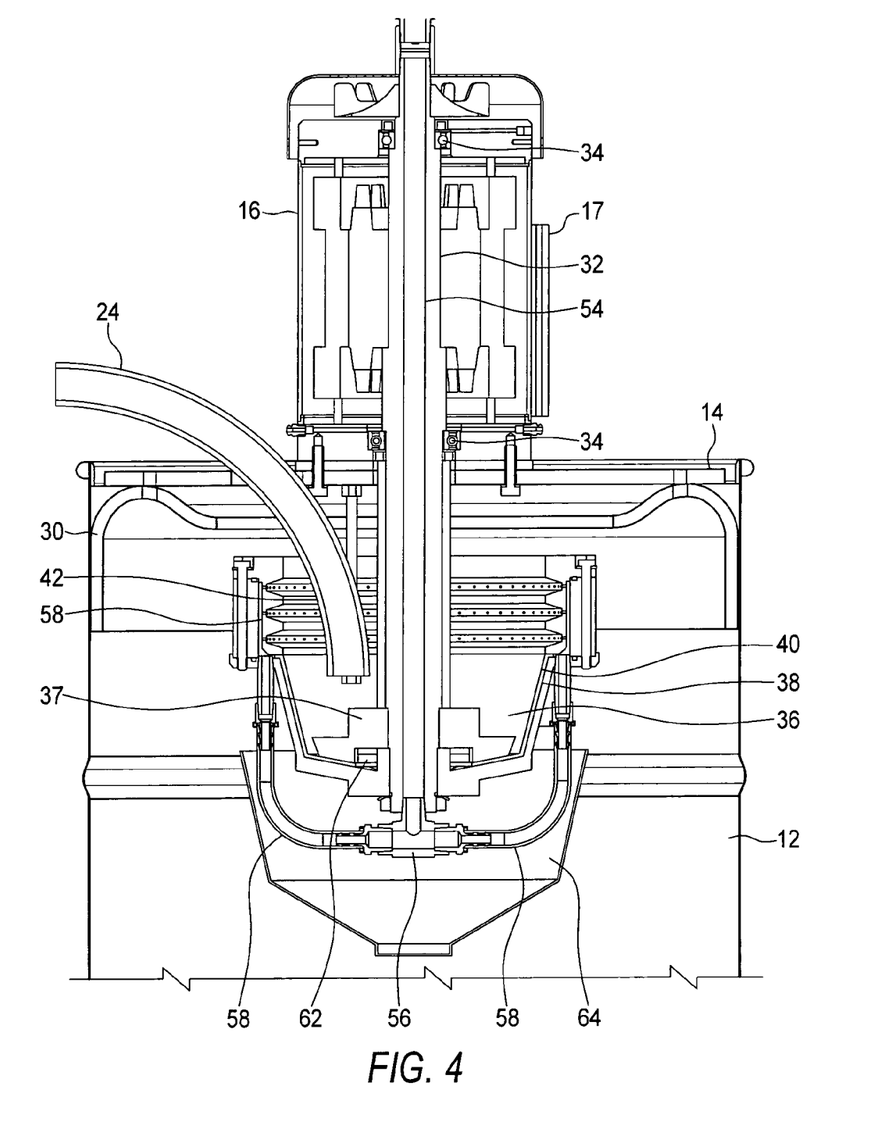
FIG. 4 is a detail cross-sectional view of the motor and rotor bowl as shown in FIG. 3.
Figure 5:
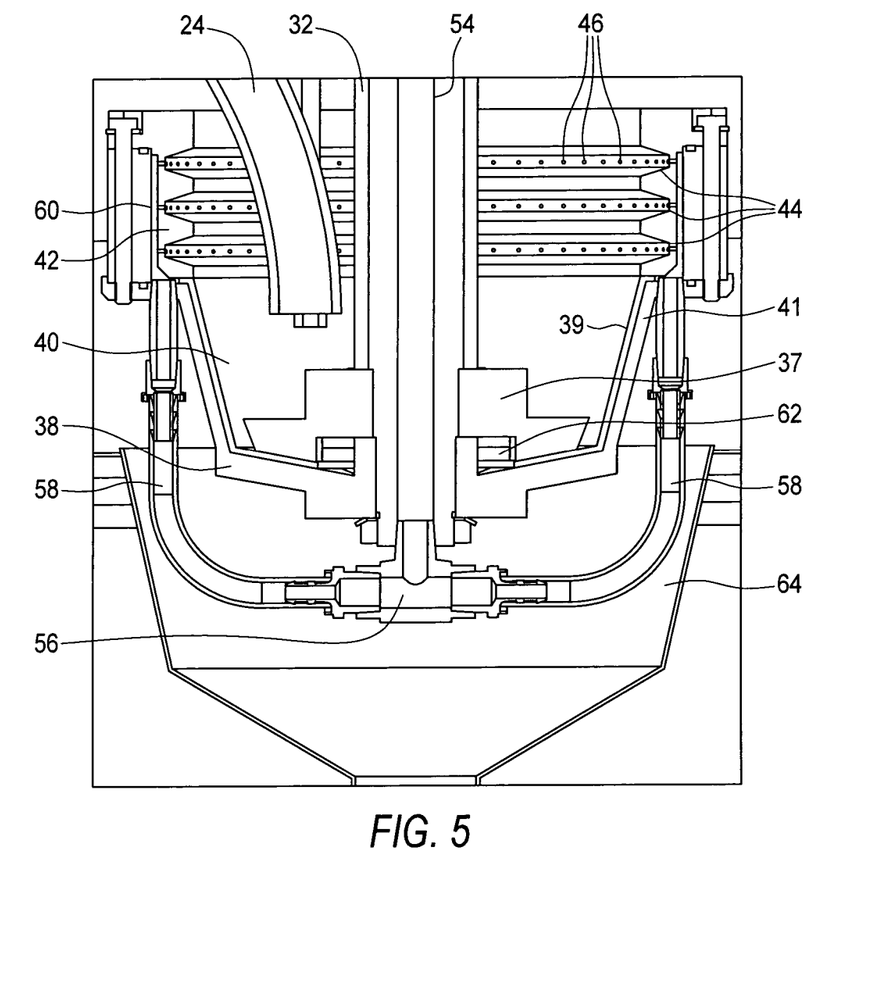
FIG. 5 is a detail cross-sectional view of the rotor bowl as shown in FIG. 3.
Figure 6:
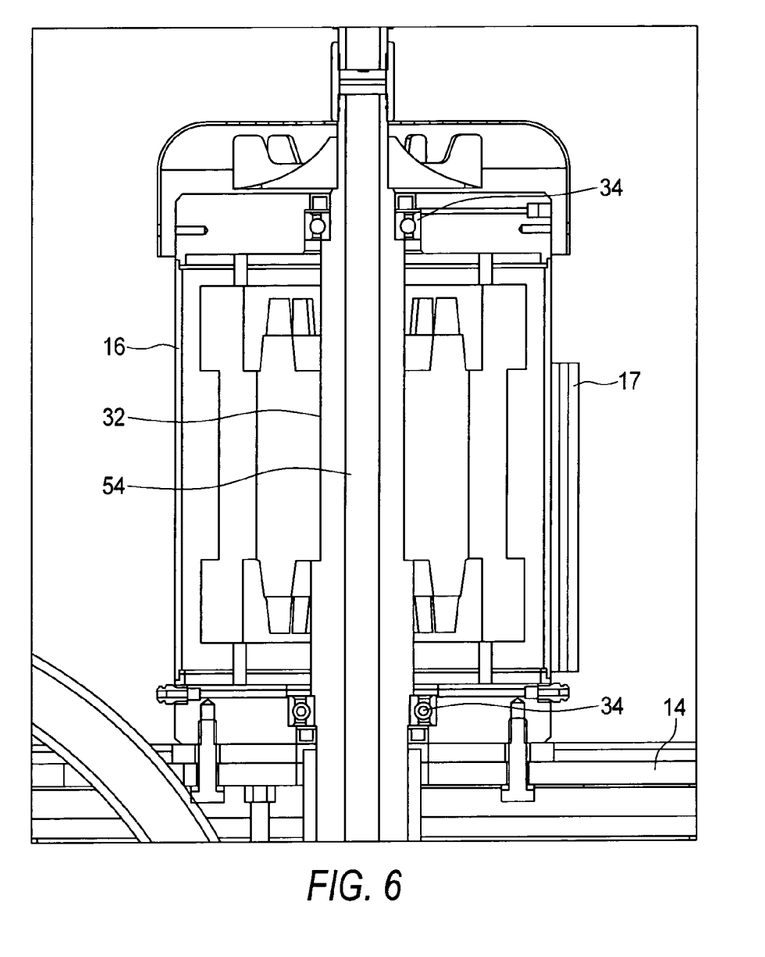
FIG. 6 is a detail cross-sectional view of the motor as shown in FIG. 3.

With reference to FIGS. 1 and 2, the centrifuge of the invention is designated by reference numeral 10. It has a rotor housing 12 comprising a hollow, rigid cylindrical drum, which is preferably formed from a standard 45-gallon drum. The top of the drum 12 is replaced with a motor support 14, which supports motor 16. Motor support 14 is provided with access openings 18 to provide access to the rotor 36 and motor support 14 provides a passageway for slurry feed pipe 24. Drum 12 also has a cut-out forming a concentrate access door 20 and a tailings discharge port 22 (FIG. 2). To stabilize the machine in operation, preferably the lower part of drum 12 is filled with concrete 26, the surface of which forms a drain to connect to outlet port 22 through channel 28.

Secured to the underside of motor support 14 is annular rubber wear protector 30 which preferably is formed of a rubber automobile tire, having the same outer diameter as the inner diameter of drum 12, and which may be formed by cutting an automobile tire in half diametrically.

Motor 16 has a hollow drive shaft 32 (FIG. 3-6) mounted on bearing assemblies 34. Rotor 36 is mounted on the lower end of shaft 32. Rotor 36 has a rotor bowl 38 of the same general type as disclosed in Canadian Patent no. 2149978. An impeller 37 is provided on the center of the floor of steel lower bowl section 41. Impeller 37 has upstanding vanes to assist in the rotation of the slurry on the bottom of the rotor bowl 38 and to direct the slurry to the wall 39 of the rotor bowl. The wall 39 of rotor bowl 38 forms a smooth outwardly-inclined migration zone 40 lined with wear-resistant rubber, and a fluidized capture zone 42 above the migration zone, wherein the capture zone 42 has a number of fluidized annular cavities 44. Cavities 44 are provided with a fluidizing fluid under pressure through apertures 46. The capture zone is fluidized from a source of liquid under pressure located radially outwardly of the capture zone as follows.

Figure 7:
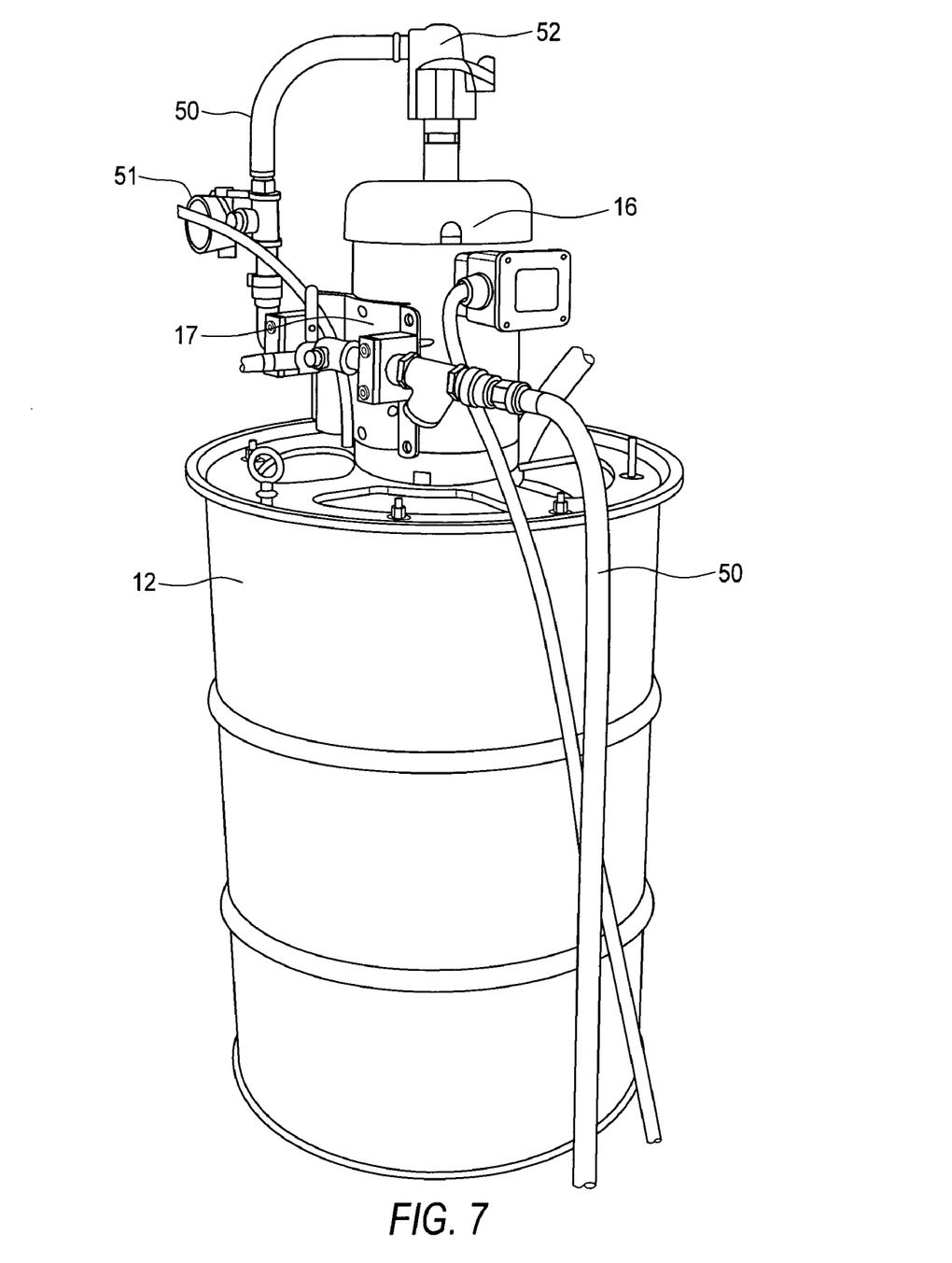
FIG. 7 is a perspective view of the centrifuge of the invention showing the water supply connections.

Fluidizing water under pressure is supplied to the cavities 44 from a stationary water supply line 50 which is connected to rotating union 52. Rotating union 52 provides the water from stationary water supply line 50 to water line 54 which runs down the center of hollow shaft 32. Hollow shaft 32 could itself also serve as the water supply line. Line 54 connects by a T-connection 56 to two rotating supply lines 58. Rotating supply lines 58 provide the water to manifold 60 which communicates with apertures 46. Supply line 50 is mounted to motor 16 by a bracket 17, and has a control valve 19 (FIG. 1) to regulate the flow and a pressure gauge 51 (FIG. 7) to monitor the pressure.

Motor 16 is, for example, a 2 horsepower 6 pole electric motor, suitable to be powered by a generator in a remote location, and which is modified to provide the hollow drive shaft described above. A frequency converter such as a Penta-Drive motor control can be provided with the power supply to control the speed of motor 16 in a range of about 900 to 1200 rpms.

In operation, initially motor 16 is activated to rotate the rotor 36. The slurry feed is introduced to the spinning rotor 36 through feed pipe 24. Centrifugal forces cause the slurry to climb up the inner surface of the rotor bowl 38 before being expelled over the upper rim of the rotor, against rubber tire 30 and thence out of the drum 12 through discharge port 22. Heavier target concentrate collects in fluidized cavities 44. As the process advances, when the cavities 44 have been sufficiently filled with target concentrate, power to motor 16 is stopped, the rotation of bowl 36 slows, and water is sprayed through openings 18 using a wash hose, and from apertures 46, to wash the concentrate out through channels 62 in the impeller 37 and lower floor of rotor bowl 38 and out through funnel 64. Either a container can be inserted under funnel 64 through access port 20, or a discharge pipe, not shown, can direct the concentrate outside the drum.

The combination of the channels 62 through impeller 37 and Rotor bowl 38 to funnel 64 enables rapid concentrate recovery. This method of discharging concentrate around a rotor baffle in the bottom of the rotor is disclosed in U.S. Pat. No. 4,824,431 and Canadian Patent no. 2149978. It results in short off line time for rinsing concentrate, which is useful for tin and tantalum applications as well as gold. Having the drive/support for the rotor bowl above the rotor bowl allows a simple, stationary funnel unobstructed below the bowl with a hose attached to it to recover concentrate. The hose is ducted outside the drum. Recovering concentrate is then done by washing it out around the baffle and into the funnel/hose assembly when the rotor is stopped or at least turning very slowly. This makes for rapid concentrate recovery after each concentrating cycle, which is important for applications where the gold is locked in another mineral, and also for tin and tantalum.

Figure 8:
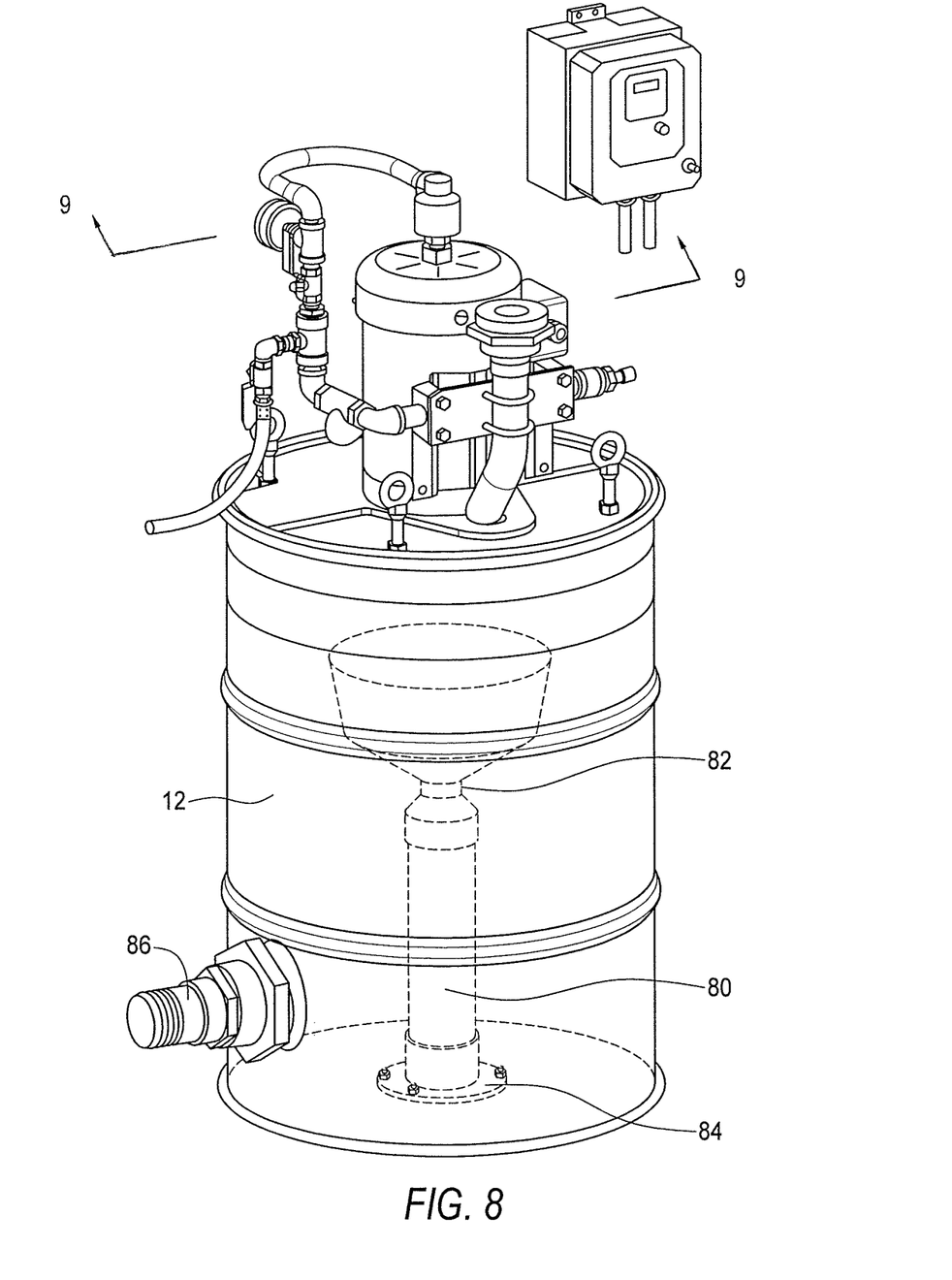
FIG. 8 is a perspective view of the centrifuge of the invention with a second embodiment of the tailings discharge arrangement.
Figure 9:
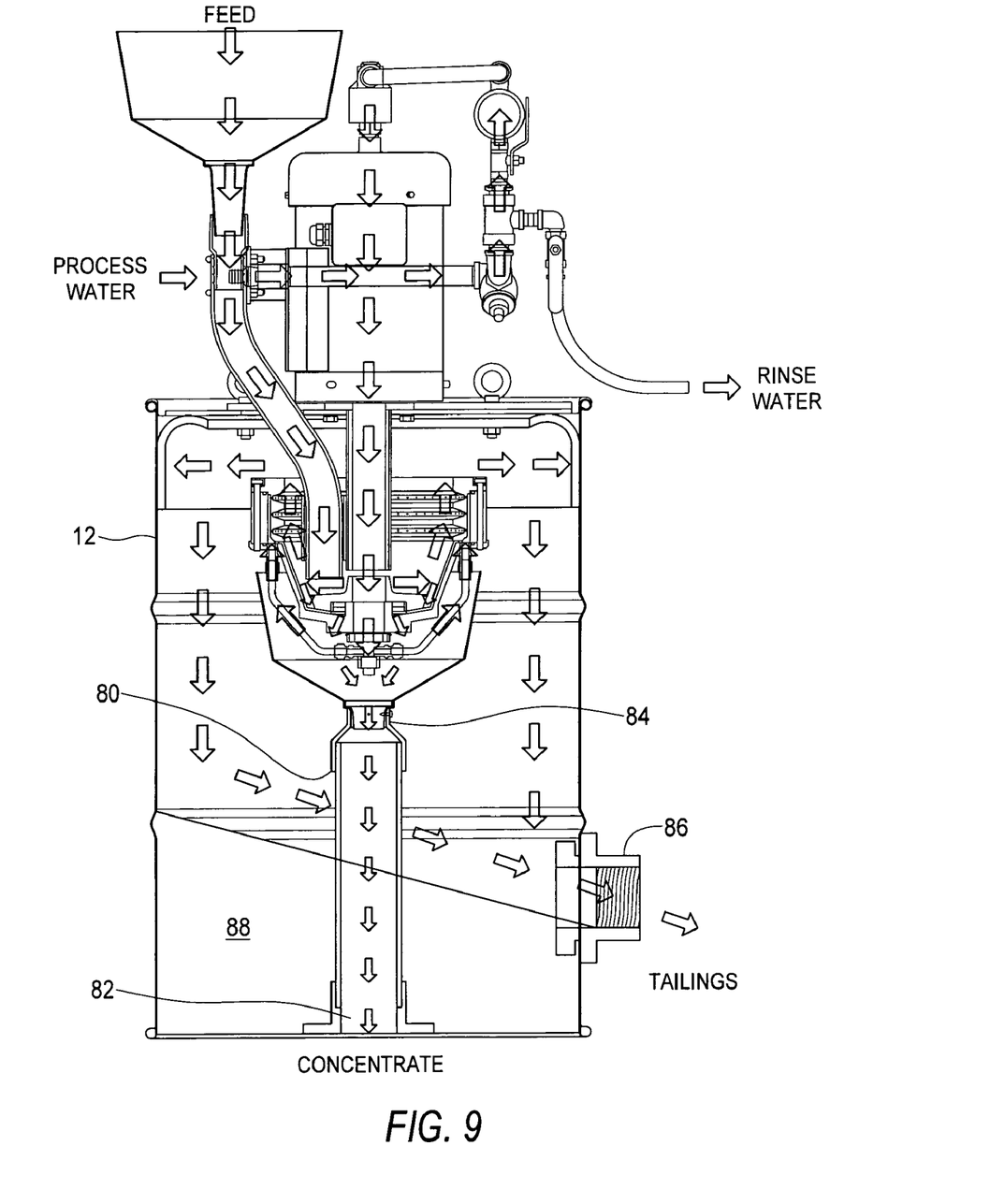
FIG. 9 is a cross-sectional view of the embodiment of FIG. 8 Taken along lines 9-9 showing the flow of materials.

FIG. 8 shows a second embodiment of the tailings discharge in which a pipe 80 is connected at 82 to the outlet of bowl 38 to wash the tailings directly to an outlet 84 in the bottom of drum 12, as further illustrated in FIG. 9. In the embodiment shown in FIGS. 8 and 9, rather than providing concrete to stabilize drum 12, the sand and tailings 88 are allowed to build up in the bottom of the drum, below outlet 86, which serves to stabilize the centrifuge during operation.

While fluidizing water has been disclosed as the fluid being delivered through hollow shaft 32, other gases or fluids such as compressed air or hydraulic fluid may be delivered in the same way to the rotor. In this way the present applicant's variable lip centrifuge as disclosed in co-pending international patent application no. PCT/CA2006/000596, filed Apr. 13, 2006, which is incorporated herein by reference, could also be configured with the drive motor above and supporting the rotor.

While use of a fluidized capture zone has been disclosed above, the invention is also useful without a fluidizing section. In that case shaft 32 is solid, while maintaining the advantage that the shaft serves both as the motor drive shaft and to suspend the rotor. In this variant the machine can also be configured with the drive motor above and supporting the rotor. Since supply of fresh water for fluidizing is often difficult in the artisanal mining context, it may be preferable to construct the device in this way for some applications, though the capture of concentrate is less efficient than with the fluidized capture zone and more frequent stoppage of the device will be required.

By utilizing the shaft of the motor both to drive and suspend the rotor, the number of bearing assemblies and other moving parts required for the machine is reduced and the cost is thereby reduced. Allowing the miner to assemble the machine using local 45-gallon drums and tires further reduces expenses. The 45 gallon drum can also be used as a convenient shipping container for the machine. The bowl is preferably driven and suspended from above to keep the motor out of the slurry area and maximize the simplicity of the design. However the drive motor could also be mounted below the rotor while still using the common hollow shaft both to drive and support the rotor and deliver the fluidizing fluid.

The discovery that the hollow drive shaft of a motor can be used both to drive a rotating element and deliver a fluid has been found to have other useful applications, such as a lawn or garden sprinkler, wherein a series of liquid outlets is provided at the end of the hollow drive shaft. Where the liquid is air, the same arrangement can be used to inject air into the rotating agitator blade of a flotation machine. The same arrangement can be used to pass hydraulic fluid through one or more passages to power a tool attached to the rotating drive shaft.

As will be apparent to those skilled in the art, various modifications and adaptations of the structure above described may be made without departing from the spirit of the invention. While the preferred embodiment has been described in the context of the separation of higher density particles from a slurry, it will be apparent to those skilled in the art that the invention has similar application in the separation of any two flowable substances of differing density, whether solid particles from solid particles, liquid from liquid or solid particles from liquid.

What is claimed is:

1. A centrifugal concentrator for separating particulate material of higher specific gravity from a liquid slurry comprising a liquid and particulate material of different specific gravities comprising:
   a) a housing;
   b) a hollow drum having an open upper end, a hollow interior providing an inner surface, a lower end provided with a discharge outlet for removal of particulate material and being adapted for rotation about a central vertical axis;
   c) means for rotatably supporting the hollow drum on an axis within said housing;

d) a drive motor comprising a vertically oriented drive shaft for rotating the hollow drum about the axis; and e) material supply means to deliver said liquid slurry into said hollow interior of said hollow drum;

wherein said hollow drum is supported for rotation in said housing on said drive shaft, said drive shaft forming said central vertical axis of said hollow drum, wherein said drive means is supported in a position vertically above said hollow drum and whereby said hollow drum hangs from said drive shaft and said lower end of said hollow drum is suspended above a concentrate recovery area.

2. The concentrator of claim 1 wherein said drive means is supported above said housing in a position vertically above said hollow drum.

3. The concentrator of claim 1 wherein a portion of said inner surface of said hollow drum is adapted to be fluidized through apertures in said inner surface with liquid from a source of liquid under pressure supplied to said apertures through liquid supply means.

4. The concentrator of claim 3 wherein said drive shaft is hollow and said liquid supply means extends down said hollow drive shaft.

5. The concentrator of claim 4 wherein said liquid supply means comprises a stationary liquid supply line connected to a rotating union which communicates with liquid supply means extending along the vertical axis of said drive shaft.

6. The concentrator of claim 1 wherein said housing comprises a hollow, rigid cylindrical drum.

7. The concentrator of claim 6 wherein said cylindrical drum is stabilized by a weighty material provided in the lower portion thereof.

8. The concentrator of claim 7 wherein said housing comprises a 45 gallon drum partially filled with concrete for stability.

9. The concentrator of claim 1 wherein said housing comprises an annular wear protector secured to the upper inner surface of said housing.

10. The concentrator of claim 9 wherein said annular wear protector comprises a portion of a rubber automobile tire, having the same outer diameter as the inner diameter of said drum.

11. A kit for assembling, in combination with a hollow housing, a centrifugal concentrator for separating particulate material of higher specific gravity from a liquid slurry comprising a liquid and particulate material of different specific gravities comprising:

a) a hollow drum having an open upper end, a hollow interior providing an inner surface, a lower end provided with a discharge outlet for removal of particulate material and being adapted for rotation about a central vertical axis;

b) means for rotatably supporting the drum on an axis within said housing;

d) a drive motor comprising a vertically oriented drive shaft for rotating the drum about the axis; and e) material supply means to deliver said liquid slurry into said hollow interior of said drum;

wherein said hollow drum is supported for rotation in said housing on said drive shaft, said drive shaft forming said central vertical axis, and f) means for supporting said drive motor above said housing in a position vertically above said hollow drum;

whereby said hollow drum hangs from said drive shaft and said lower end of said hollow drum is suspended above a concentrate recovery area.

12. The kit of claim 11 wherein said housing comprises a 45 gallon drum partially filled with concrete for stability.

13. A method of operating a centrifugal concentrator for separating particulate material of higher specific gravity from a liquid slurry comprising a liquid and particulate material of different specific gravities, wherein said centrifugal concentrator comprises:

a) a housing;

b) a hollow drum having an open upper end, a lower end, a hollow interior providing an inner surface and being adapted for rotation about a central vertical axis;

c) means for rotatably supporting the drum on an axis;

d) a drive motor comprising a vertically oriented drive shaft for rotating the drum about the axis; and e) material supply means to deliver said liquid, slurry into said hollow interior of said drum;

wherein said hollow drum is supported for rotation in said housing on said drive shaft, said drive shaft forming said central vertical axis, and said hollow drum further comprises a discharge outlet adjacent said lower end wherein said drive means is supported in a position vertically above said hollow drum and whereby said hollow drum hangs from said drive shaft and said lower end of said hollow drum is suspended above a concentrate recovery area, said method comprising;

a) rotating said hollow drum;

b) feeding said slurry through said material supply means;

c) providing liquid under pressure through apertures in said inner surface to provide radially inwardly directed fluidizing liquid through said apertures to agitate said slurry adjacent said inner surface of said hollow drum;

d) stopping the supply of said slurry to said hollow bowl;

e) reducing the speed of said rotation of said hollow drum and substantially simultaneously providing a reduced volume of fluidizing liquid under pressure through said apertures; and f) washing captured particles out of said hollow drum through said discharge outlet.

* * * * *